(12) United States Patent
Vidmar

(10) Patent No.: US 7,900,940 B1
(45) Date of Patent: Mar. 8, 2011

(54) PEDESTRIAN CYCLE

(76) Inventor: David J. Vidmar, Ashland, OR (US)

( * ) Notice: Subject to any disclaimer, the term of this patent is extended or adjusted under 35 U.S.C. 154(b) by 284 days.

(21) Appl. No.: 12/156,174

(22) Filed: May 30, 2008

Related U.S. Application Data

(60) Provisional application No. 60/993,680, filed on Sep. 12, 2007.

(51) Int. Cl.
B62M 1/00 (2010.01)
(52) U.S. Cl. ............... 280/87.021; 280/290; 280/271; 482/74
(58) Field of Classification Search .......... 280/87.051, 280/87.021, 826, 271, 242.1, 267, 269, 266, 280/290, 282; 482/68, 77, 74
See application file for complete search history.

(56) References Cited

U.S. PATENT DOCUMENTS

| 1,518,037 | A | * | 12/1924 | Wilson | 280/242.1 |
|---|---|---|---|---|---|
| 1,748,183 | A | | 2/1930 | Montague | |
| 3,180,678 | A | | 4/1965 | McCabe | |
| 4,619,462 | A | * | 10/1986 | Shaffer et al. | 280/242.1 |
| 4,681,332 | A | * | 7/1987 | Malone | 280/87.021 |
| 4,828,251 | A | * | 5/1989 | Schreiber | 482/77 |
| 5,167,597 | A | | 12/1992 | David | |
| 5,174,590 | A | | 12/1992 | Kerley et al. | |
| 5,526,893 | A | * | 6/1996 | Higer | 482/68 |
| 5,603,677 | A | * | 2/1997 | Sollo | 482/69 |
| 5,667,461 | A | * | 9/1997 | Hall | 482/69 |
| 5,732,964 | A | | 3/1998 | Durham et al. | |
| 5,997,017 | A | | 12/1999 | Tilley | |
| 6,102,420 | A | * | 8/2000 | Hoeksta | 280/269 |
| 6,302,828 | B1 | * | 10/2001 | Martin et al. | 482/69 |
| 6,578,594 | B1 | | 6/2003 | Bowen et al. | |
| 7,341,543 | B2 | * | 3/2008 | Dandy | 482/68 |
| 2004/0063550 | A1 | | 4/2004 | Harris | |
| 2005/0085349 | A1 | | 4/2005 | Dandy | |

* cited by examiner

Primary Examiner — Hau V Phan
(74) Attorney, Agent, or Firm — Jerry Haynes Law

(57) ABSTRACT

A pedestrian cycle, to which the invention provides substantial improvements. An illustrative embodiment of the pedestrian cycle is comprised of: a generally U-shaped, partible overhead cycle frame that provides an intrinsic suspension and spring-cushioned ride; front wheel and rear wheel assemblies with customary steerage and brakes; and an exemplary saddle assembly that completely averts pressure on the perinea of the rider while allowing unobstructed leg movement. The saddle assembly is suspended from the cycle frame by a plurality of flexible and adjustable straps which not only isolate the rider from vibration, but allow the rider to hold his or her body vertical while leaning the cycle into a turn as he or she walks or runs. Finally, the invention provides fun outdoor exercise, therapy, or training, with substantively enhanced ambulatory capacity and substantively reduced internal and external impact to the body in all human gaits and to all users able and, importantly, disabled.

17 Claims, 4 Drawing Sheets

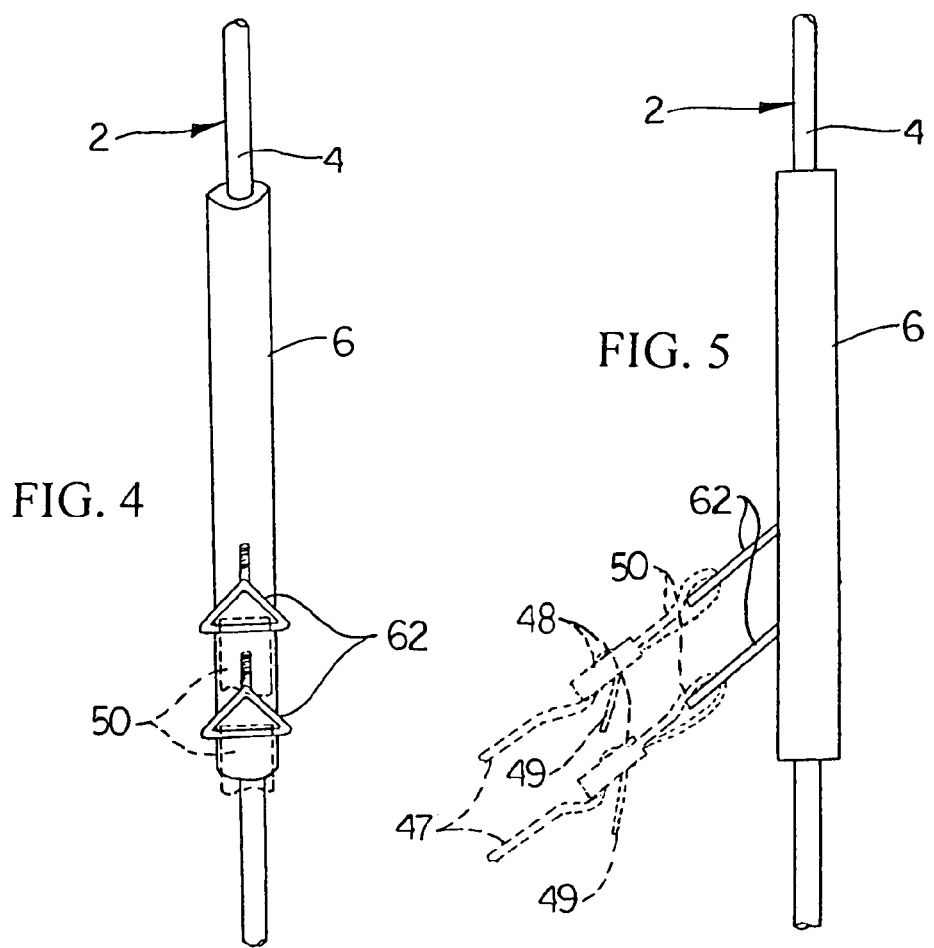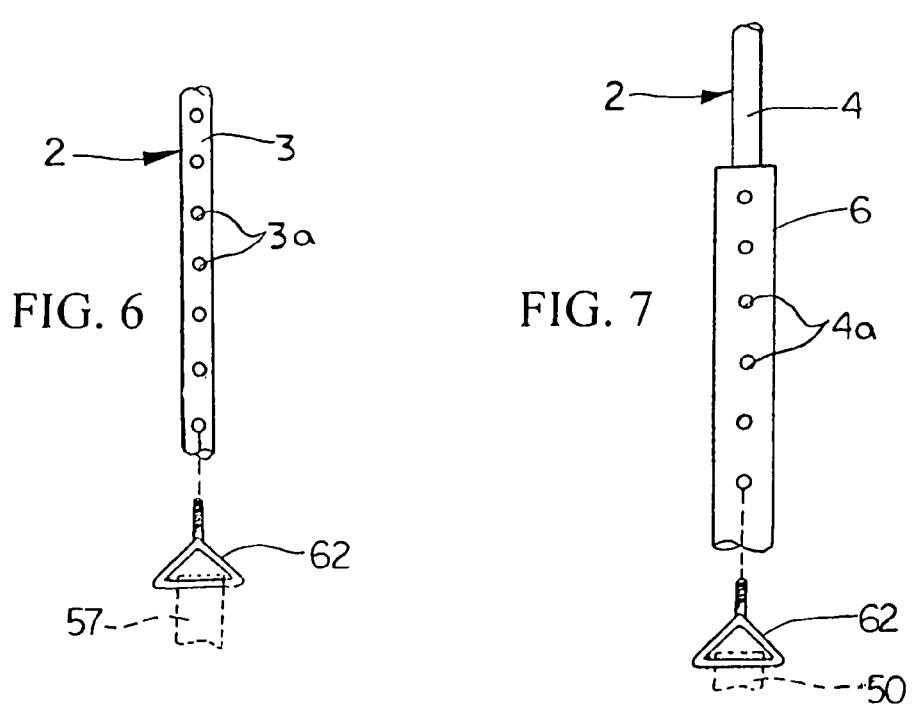

PEDESTRIAN CYCLE

CROSS REFERENCE TO RELATED APPLICATIONS

The present patent application is related to and claims the benefit of priority from U.S. Provisional Patent Application No. 60/993,680, filed on 12 Sep., 2007, entitled "Glyde-Cycle," which is hereby incorporated by reference in its entirety.

FIELD

The present disclosure relates to cycle-type transportation, rehabilitation, therapy, and exercise devices with and without pedals. More particularly, the present disclosure relates to a pedestrian cycle without pedals that supports a user as the user walks or runs or ambulates in any gait and propels the cycle on a supporting surface.

BACKGROUND

Since the German patent of the Laufmachine in 1820 was issued in Baden, the idea of ambulation on a two or three-wheeled cycle without pedals has attracted riders. But, this invention, later called the Draiesenne in France, and others such as the American dandyhorse or the English Boneshaker were uncomfortable and undoubtedly painful to the crotch of the rider. As are modern bicycle seats, their very use is indictable as dangerous to the rider's perinea, its critical artery and its sensitive soft tissue, and are presently further indicted in the cause of erectile dysfunction in male bicyclists and loss of genital sensitivity in female bicyclists.

Bicycles having pedals created a successful paradigm of diverse rider positions that alleviated at least some of the excessive perineal pressure problems and provided a reasonable measure of comfort with the advent of now common suspension elements. But pedal cycles require capacities of balance and strength that many people, young and especially old, and certainly the disabled cannot muster without endangerment. Pedal cycles remain particularly useless to those disabled, handicapped, and recovering from injury. Additionally, for those using pedal cycles, especially outdoors, a great distance at reasonable speeds or a short distance at dangerous speeds is necessary to achieve desired exercise and aerobic goals that are easy to achieve running or walking for the less athletic.

Prior art is replete with examples of pedestrian cycles without pedals that fail to offer adequate steering control to the rider, comfortable suspension, and that fail to provide for ambulation in all human gaits with substantively little or even reasonable impact and jarring on the user's joints and organs both internal and external. Importantly, prior art cycles without pedals fail to avert dangerous seat or saddle pressure on the rider's perinea.

Some prior art pedestrian cycles support a small portion of a jogging rider's weight in a harness, alleviating perineal pressure, and slightly reducing joint impact. However, the harness straps of the invention dig into the rider's skin and musculature resulting in discomfort. Further, by transferring only a small portion of the rider's weight to the cycle through bungee cords, the Dandy invention remains unable reduce the impact of the rider contacting the ground substantially and jarring of external and internal organs and skeletal joints remains.

Individuals walking or running without a pedestrian cycle lacking pedals typically wear shoes having soft soles that help absorb the impact of each step. Even with the use of soft-soled or other special shoes, however, ambulation on any surface remains unsupportably jarring to joints and organs, ultimately contributing to health problems over time.

The following problems remain unresolved by prior art and are identified here:

1. The problems of ambulation and therapeutic exercise, especially outdoors and for long periods of time and of long distances remain for those individuals:
 A: disabled, handicapped, over-weight or aged,
 B: missing elements of lower limbs,
 C: unable to balance on their own,
 D: unable to support their weight and ambulate without pain and further injury,
 E: undergoing therapy or rehabilitation of injury to hips and lower limbs,
 F: needing to remain ambulatory for long patrol or travel.

2. The problem of dangerous seat or saddle pressure on the sensitive perinea remains for male and female riders of all types of cycles who ride for any significant length of time.

3. The problem of providing for ambulation in all human gaits with substantively little impact on the user's skeletal joints and substantively little jarring of both internal and external organs.

4. The problem of achieving ambulatory, outdoor, aerobic exercise with substantively little impact on joints and organs of the body from the most disabled riders to the most athletic and fit.

Therefore, a pedestrian cycle is needed which supports a user in a seat or saddle that can avert dangerous pressure on the perinea, and that substantively mitigates the jarring effects of walking, running or ambulating in any gait as the able or disabled rider propels the cycle on a supporting surface.

SUMMARY

The present disclosure is generally directed to a pedestrian cycle. An illustrative embodiment of the pedestrian cycle includes cycle frame, a front wheel and a rear wheel provided on the pedal-less cycle frame and an exemplary saddle assembly suspended from the cycle frame between the front wheel and the rear wheel.

BRIEF DESCRIPTION OF THE DRAWINGS

The disclosure will now be made, by way of example, with reference to the accompanying drawings, in which:

FIG. 4 is a rear view of a front frame member section of a cycle frame, more particularly illustrating an exemplary technique for attaching a saddle assembly of the pedestrian cycle to the cycle frame;

FIG. 5 is a side view of a front frame member section of the cycle frame, more particularly illustrating an exemplary technique for attaching the saddle assembly of the pedestrian cycle to the cycle frame;

FIG. 6 is a front view of a rear frame member section of the cycle frame, more particularly illustrating selective adjustable attachment of the saddle assembly of the pedestrian cycle to the cycle frame;

FIG. 7 is a rear view of a front frame member section of the cycle frame, more particularly illustrating adjustable attachment of the saddle assembly of the pedestrian cycle to the cycle frame;

DETAILED DESCRIPTION

Figures 1, 2, 3:
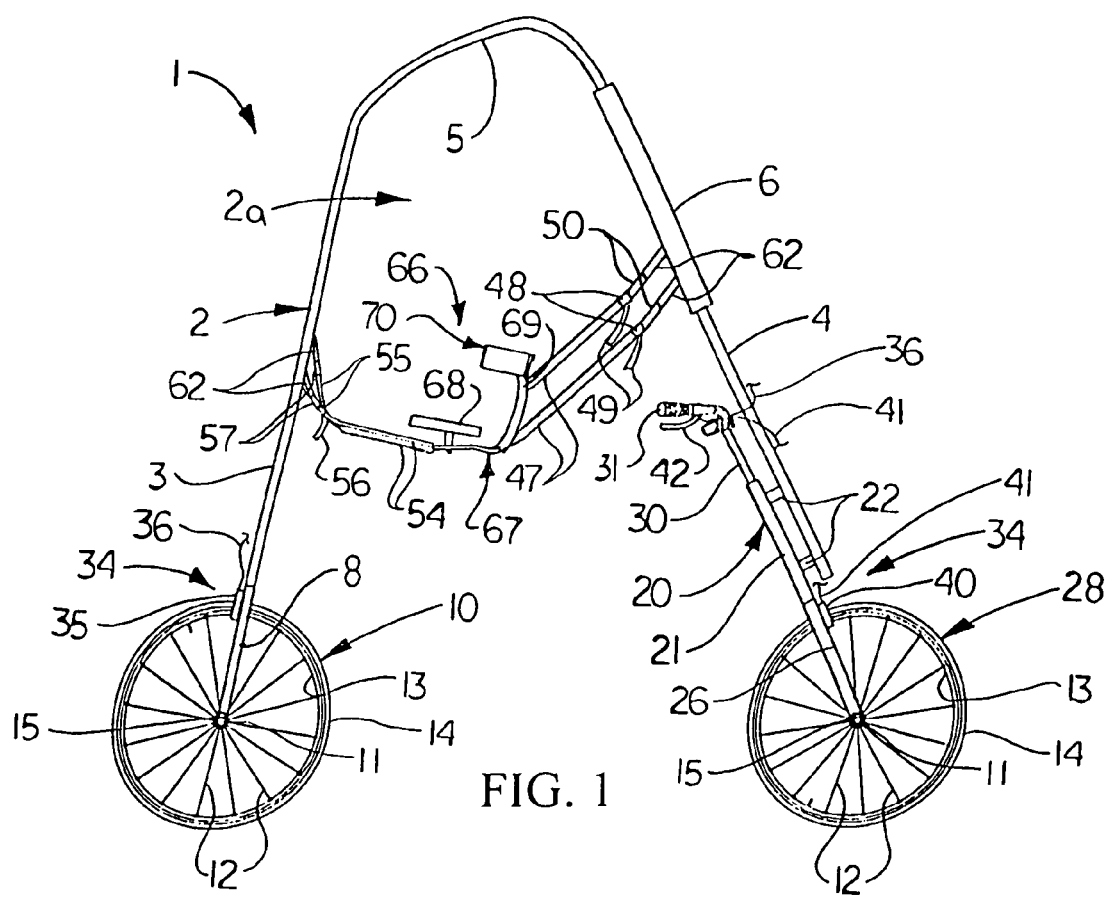
FIG. 1 is a right side view of an illustrative embodiment of the pedestrian cycle.
FIG. 2 is a front view of an illustrative embodiment of the pedestrian cycle.
FIG. 3 is a rear view of an illustrative embodiment of the pedestrian cycle.
Figure 8:
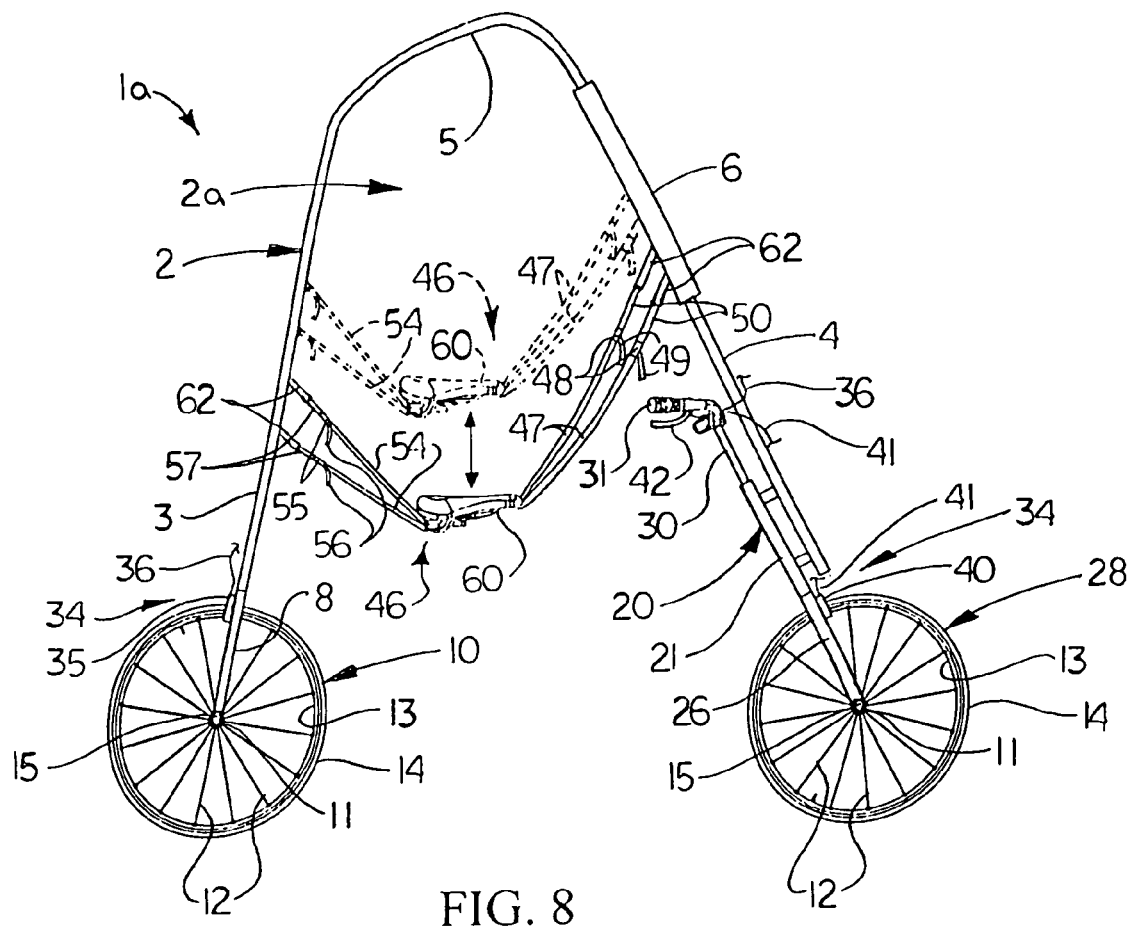
FIG. 8 is a right side view of an alternative illustrative embodiment of the pedestrian cycle, more particularly illustrating selective height adjustment of the saddle assembly on the cycle frame of the pedestrian cycle.

Referring initially to FIGS. 1-7 and 10 of the drawings, an illustrative embodiment of the pedestrian cycle is generally indicated by reference numeral 1. As illustrated in FIG. 1, the pedestrian cycle includes a cycle frame 2. The cycle frame 2 may be a lightweight metal or composite material, for example and without limitation, and may have a generally inverted U-shaped configuration. Accordingly, the cycle frame 2 may have a generally elongated rear frame member 3; a generally elongated front frame member 4 which is oriented at an acute angle with respect to the rear frame member 3; and a connecting frame member 5 which connects the rear frame member 3 and the front frame member 4. As further illustrated in FIG. 1, the rear frame member 3; the front frame member 4; and the connecting frame member 5 may define a frame interior 2a. A pad 6 may be provided on the front frame member 4 for purposes that will be hereinafter described.

A rear wheel 10 and a front wheel 28 are provided on the rear frame member 3 and the front frame member 4, respectively, of the cycle frame 2. As illustrated in FIG. 3, a generally inverted U-shaped rear wheel frame 8 typically extends from the rear frame member 3. As illustrated in FIG. 2, a generally inverted U-shaped front wheel frame 26 is provided on the front frame member 4 typically in a manner that will be hereinafter described. The rear wheel 10 and the front wheel 28 are rotatably mounted in the rear wheel frame 8 and the front wheel frame 26, respectively. The rear wheel 10 and the front wheel 28 may each include a wheel axle 15 which extends between the parallel extending members of the respective rear wheel frame 8 and front wheel frame 26, a wheel hub 11 which is provided on the wheel axle 15, wheel spokes 12 which extend outwardly from the wheel hub 11, a wheel rim 13 which is provided on the wheel spokes 12 and a tire 14 provided on the wheel rim 13. Alternative designs for the rear wheel 10 and the front wheel 28 are possible.

A steering assembly 20 may be provided on the front frame member 4 of the cycle frame 2 to facilitate steering of the pedestrian cycle 1. In some embodiments, the steering assembly 20 may include a handlebar shaft receptacle 21 that is attached to the front frame member 4 such as through one or multiple attachment members 22 and/or other attachment technique that is known by those skilled in the art. The handlebar shaft receptacle 21 may extend in generally parallel relationship with respect to the front frame member 4. An elongated handlebar shaft 30 extends through and is rotatable with respect to the handlebar shaft receptacle 21. Handlebars 31 are provided on a first end of the handlebar shaft 30 in the frame interior 2a of the cycle frame 2. A second end of the handlebar shaft 30 engages the front wheel frame 26. Accordingly, rotation of the handlebar shaft 30 in the handlebar shaft receptacle 21 by gripping of the handlebars 31 facilitates turning of the front wheel frame 26 and the front wheel 28 to facilitate steering of the pedestrian cycle 1. In some embodiments the shape of the handlebar 31 may allow for the rider to run erect with the hands drawn to the body.

In some embodiments, a brake system 34 may engage the rear wheel 10 and/or the front wheel 28. The brake system 34 may include, for example, a pair of rear brake calipers 35 or other brake types known by those skilled in the art provided on the rear wheel frame 8 and adapted to engage the wheel rim 13 of the rear wheel 10. A rear brake handle 37 (FIG. 2) is provided on the handlebars 31. A rear brake cable 36 connects the rear brake handle 37 to the rear brake calipers 35. The brake system 34 may additionally or alternatively include a pair of front brake calipers 40 provided on the front wheel frame 26 and adapted to engage the wheel rim 13 of the front wheel 28. A front brake cable 41 couples the front brake calipers 40 to a front brake handle 42 provided on the handlebars 31. Accordingly, hand pressure applied to the rear brake handle 37 and the front brake handle 42 causes the rear brake calipers 35 and the front brake calipers 40, respectively, to engage the wheel rim 13 of the rear wheel 10 and the front wheel 28, respectively.

Figure 10:
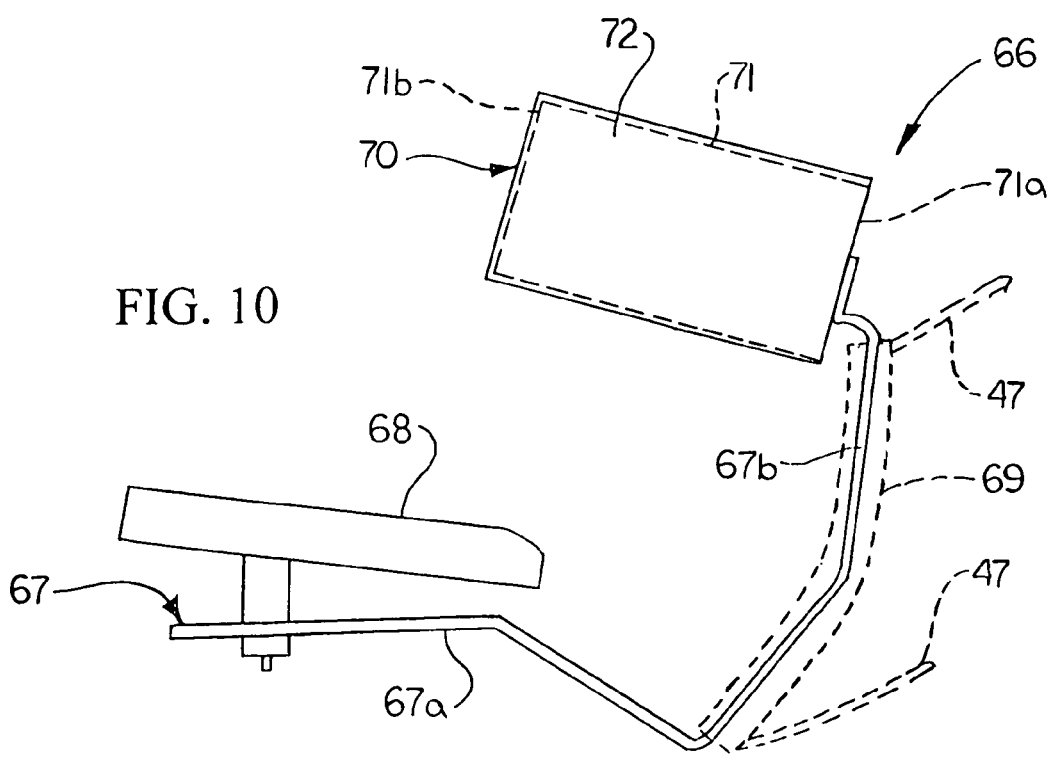
FIG. 10 is a side view of the saddle and brace assembly of the pedestrian cycle illustrated in FIG. 1.

As further illustrated in FIGS. 1 and 10, a saddle assembly 66 is supported by the cycle frame 2, in the frame interior 2a and between the rear frame member 3 and the front frame member 4. The saddle assembly 66 may include a seat and brace frame 67 that is attached to a pair of front seat support straps 47 and a pair of rear seat support straps 54. Each front seat support strap 47 and each rear seat support strap 54 may be nylon or other strong, durable and flexible material. Accordingly, the front seat support strap or straps 47 and the rear seat support strap or straps 54 suspend the saddle assembly 66 between the rear frame member 3 and the front frame member 4 of the cycle frame 2.

As illustrated in FIG. 10, the seat and brace frame 67 may include a seat support portion 67a and a brace support portion 67b which extends at an angle from the seat support portion 67a. As illustrated in FIG. 1, the rear seat support strap or straps 54 is/are attached to the seat support portion 67a (FIG. 10) of the brace frame 67. A seat 68 is provided on the seat support portion 67a. The front seat support strap or straps 47 is/are attached to the brace support portion 67b of the brace frame 67. A frame pad 69 (shown in phantom in FIG. 10) may be provided on the brace support portion 67b.

A generally C-shaped brace 70 (shown in side view) is provided on the brace support portion 67b of the frame attachment sheath 67. The brace 70 may include a generally C-shaped brace frame 71, the convex surface 71a of which is attached to the brace support portion 67b of the frame attachment sheath 67. The concave surface 71b of the brace frame 71 faces the seat 68. A brace pad 72 may be provided on the brace frame 71. Accordingly, in typical application of the pedestrian cycle 1, a rider (not illustrated) sits on and straddles the seat 68 and faces the brace 70. While riding or turning the pedestrian cycle 1, the rider can lean into the concavity of the brace 70, which stabilizes the rider on the seat 68 and the rider can lean to the horizontal to drive uphill or away from the standing start.

Each front seat support strap 47 and each rear seat support strap 54 may be attached to the front frame member 4 and the rear frame member 3, respectively, of the cycle frame 2 according to any suitable technique which is known by those skilled in the art. As illustrated in FIGS. 4 and 5, in some embodiments a strap attachment eye 62 is threaded into an eye opening (not illustrated) provided in each of the front frame member 4 and the rear frame member 3. As illustrated in FIG. 5, a front attachment strap 50 (illustrated in phantom)

is attached to the strap attachment eye 62 of the front frame member 4. The front attachment strap 50 and the front seat support strap 47 may extend through a front strap adjuster 48. A front strap pull segment 49 of the front seat support strap 47 can be pulled through the front strap adjuster 48 to selectively shorten or lengthen the front seat support strap 47 and adjust the height or vertical position and the horizontal location between frame members fore and aft of the saddle assembly 66, as will be hereinafter further described. In similar manner, a rear attachment strap 57 (FIG. 1) is attached to the strap attachment eye 62 of the rear frame member 3. The rear attachment strap 57 and the rear seat support strap 54 may extend through a rear strap adjuster 55. A rear strap pull segment 56 of the rear seat support strap 54 can be pulled through the rear strap adjuster 55 to selectively shorten or lengthen the rear seat support strap 54.

As illustrated in FIGS. 6 and 7, in some embodiments multiple, spaced-apart rear seat assembly adjustment openings 3a (FIG. 6) are provided in the rear frame member 3 and multiple, spaced-apart front seat assembly adjustment openings 4a (FIG. 7) are provided in the front frame member 4 of the cycle frame 2. The front seat assembly adjustment openings 4a may additionally extend through the pad 6 provided on the front frame member 4. Each seat attachment eye 62 to which the front seat support strap 47 is attached may be threaded into a selected one of the front seat assembly adjustment openings 4a, and each seat attachment eye 62 to which the rear seat support strap 54 is attached may be threaded into a selected one of the rear seat assembly adjustment openings 3a, to facilitate height or vertical adjustment of the seat and brace assembly 66.

Figure 9:
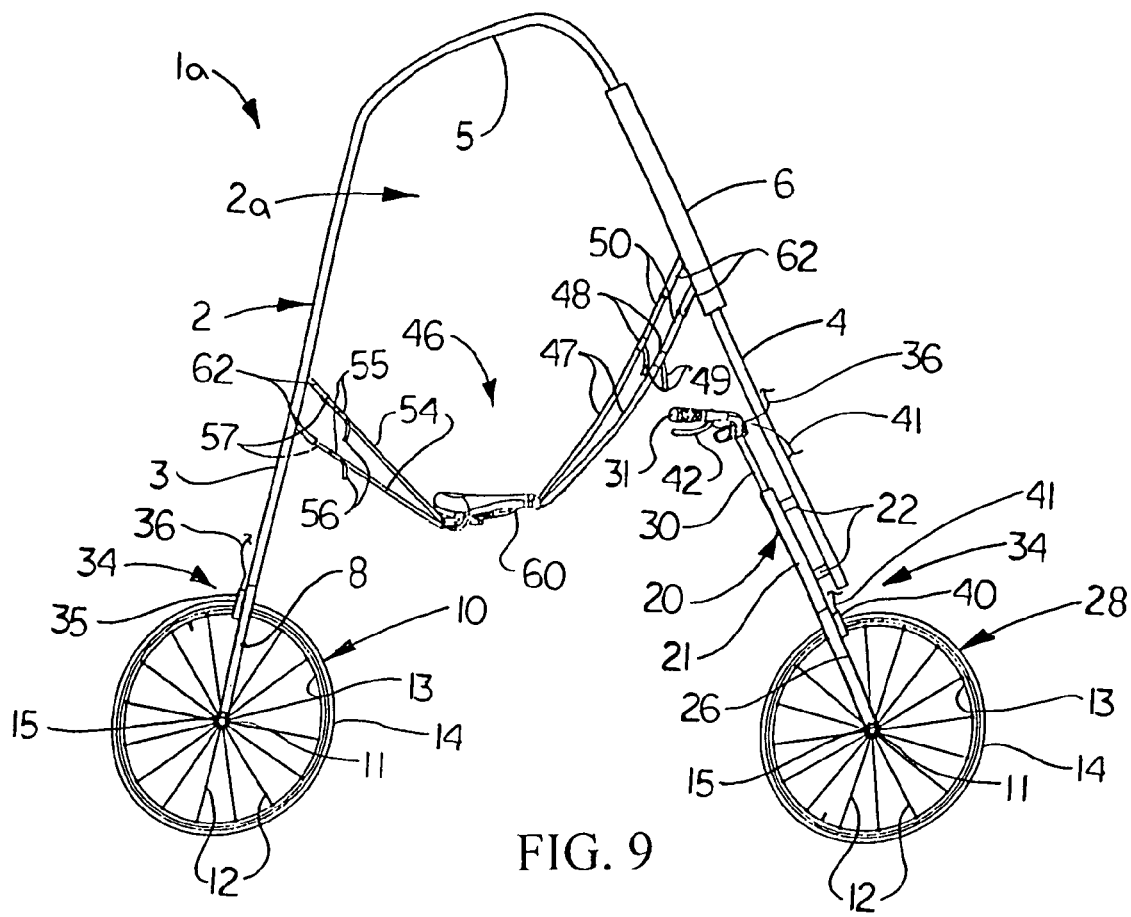
FIG. 9 is a right side view of the illustrative embodiment of the pedestrian cycle illustrated in FIG. 8 exemplifying the intrinsic spring cushion provided by the frame working in counterpoise to the weight of the rider.

Referring next to FIGS. 9 and 10 of the drawings, in some embodiments of the pedestrian cycle 1a, the saddle assembly 66 (FIGS. 1 and 10) of the pedestrian cycle 1 may be replaced by a saddle assembly 46. The seat assembly 46 may include at least one flexible front seat support strap 47 and at least one flexible rear seat support strap 54 which are attached to the front frame member 4 and the rear frame member 3, respectively, of the cycle frame 2 typically in a manner which will be hereinafter described. In some embodiments, a pair of front seat support straps 47 and a pair of rear seat support straps 54 are attached to the front frame member 4 and the rear frame member 3, respectively. Each front seat support strap 47 and each rear seat support strap 54 may be nylon or other strong, durable and flexible material. A seat 60 is attached to each front seat support strap 47 and each rear seat support strap 54 according to the knowledge of those skilled in the art. Accordingly, the front seat support strap or straps 47 and the rear seat support strap or straps 54 suspend the seat 60 between the rear frame member 3 and the front frame member 4 of the cycle frame 2.

OPERATION

FIGS. 1 to 8

Referring to FIGS. 1-7 of the drawings, in typical operation of the pedestrian cycle 1, the rear wheel 10 and the front wheel 28 are rested on a supporting surface (not illustrated) such as a street, walkway or the ground, for example. The vertical height of the seat 68 of the seat assembly 66 above the supporting surface and its horizontal location between frame members fore and aft may be selectively adjusted by sliding the front strap pull segment 49 of each front seat support strap 47 through the corresponding front strap adjuster 48 and/or the rear strap pull segment 56 of each rear seat support strap 54 through the corresponding rear strap adjuster 55. In some embodiments, additional height adjustment of the seat 60 may be made by attaching the strap attachment eye 62 of each front seat support strap 47 to a selected one of the front seat assembly adjustment openings 4a (FIG. 7) in the front frame member 4 and/or by attaching the strap attachment eye 62 of each rear seat support strap 54 to a selected one of the rear seat assembly adjustment openings 3a (FIG. 6) in the rear frame member 3 of the cycle frame 2.

A rider (not illustrated) straddles the seat 68, with a clearance (not illustrated) between the seat 68 and the perineal cavity (not illustrated) of the rider. The rider's feet touch the supporting surface (not illustrated) to steady the pedestrian cycle 1 in a generally vertical or upright position. The rider grasps the handlebars 31 as he or she simulates an ambulatory gait such as running or walking with his or her feet against the supporting surface to self-propel the pedestrian cycle 1 in a forward motion along the supporting surface. During forward motion of the pedestrian cycle 1, the rider can also simulate a gliding motion by sitting on the saddle assembly 66, lifting his or her feet from the supporting surface and placing the feet upon the provided foot rest or dangling the feet in the air. The rider will balance the pedestrian cycle 1 in an upright position while moving forward by steering of the handlebars 31, as would the rider of any ordinary and existing cycle, and by placing a foot on the ground with each step during ambulation.

The practiced rider will rock the saddle assembly 66 forward and place their pelvic horns and their transverse abdominal muscle into the concave brace pad 70, allowing the rider to lean forward, place the legs behind himself or herself and accelerate or drive the pedestrian cycle from the start position or up a hill as if in low gear. Once accelerated from the start, and on level ground, the rider then rotates back in the saddle assembly 66 to a comfortable and level cruise position. The practiced rider will adjust the saddle assembly 66 to the highest position whereby the rider's toes only are in contact with the ground providing for the highest speeds over level ground, so called, high gear.

The rider can steer the pedestrian cycle 1 while gliding with the feet held of the ground by rotation of the handlebars to the left or right. While ambulating, those practiced in the art will note the rider's position will remain vertical as the saddle assembly 66 rotates around the straps 47 and 54 while the pedestrian cycle frame is leaned to the left or right independently of the rider allowing for very tight turning operations with a secure and vertical position for the rider. The rider can further turn the pedestrian cycle while stopped, 360 degrees or any part thereof within its own wheelbase by leaning the pedestrian cycle left or right, lifting the then weightless front wheel 14 and rotating the pedestrian cycle around the arc while turning the body by moving the feet as if spinning in a circle.

The rider can slow or stop the pedestrian cycle 1 typically by manual application of the rear brake handle 37 and/or the front brake handle 42 of the brake system 34 and/or by slowing with the feet as a runner without the pedestrian cycle would slow down and stop. In the case of an immanent loss of control or other accident, the rider may allow the pedestrian cycle to drop to the ground while the rider, who is already in contact with the ground or may place the feet on the ground rapidly, will slow down and stop as would a runner without the pedestrian cycle.

The pad 6 may be provided on the front frame member 4 to protect against chaffing of the neck and face when leaning forward when going uphill or during initial acceleration and to cushion occasional contact with the helmet of the rider. It will be appreciated by those skilled in the art that during the simulated ambulatory motion of the rider to propel the pedestrian cycle 1 in a forward motion, the saddle assembly 66 may support most or a large portion of the rider's weight upon each step and all of the riders weight between each step. Thus the rider does not ever catch his or her body weight at the forward end of each step, but lifts his leg from contact with the ground as the leg of a man on a scooter would, thereby reducing impact to the joints and organs substantively near zero impact. This contributes to a more comfortable and less jarring mode of exercise than walking, skipping, jogging or running for all users, and notably brings enhanced ambulatory potential to persons debilitated by age, disability or infirmity more than can be experienced by relevant prior art cited herein, or ambulation with the unassisted body.

ADVANTAGES

From the descriptions above, a number of advantages of some embodiments of the pedestrian cycle become evident to those skilled in the art, as the pedestrian cycle will:

- a. Allow a rider to ambulate in any human gait, and experience substantively little impact on the joints, and no jarring of the organs, both internal and external.
- b. Allow a rider to reach high levels of aerobic training and muscle training in short periods of time and distance.
- c. Allow a rider to ambulate, exercise and transport quickly over long periods of time and distance with minimal fatigue caused by impact and jarring.
- d. Allow ambulation in any human gait to riders challenged by pain, weight, age, infirmity, or disability including children and those with missing limbs and prosthetics.
- e. Allow a rider having a balance disability to ambulate.
- f. Allow rider's afflicted with shaking syndrome disorders to coordinate movements through repetitive rocking motion, a proven therapy.
- g. Allow all riders to remain in the saddle assembly 66 indefinitely without any pressure to the perineal cavity or its vulnerable components.
- h. Provides a notably specific exercise to the hamstring and glut musculature for which few workout methods or machines show capacity.
- i. Allow riders to ambulate for extended distances and times at 6 to 10 mph.
- j. Allow riders to sprint to speeds of 16 to 18 mph or more on level ground.
- k. Allow a rider to achieve therapy and rehabilitation goals more rapidly and in the therapeutic outdoor environment.
- l. Allow for comfortable use on many varied topographies and terrain surfaces.
- m. Allow for three distinct rider positions giving the pedestrian cycle capacity to glide downhill, cruise on level ground, and climb hills to steep grades.
- n. Allow riders of different capacities to ambulate together such as the aged and the young, the overweight and the fit, the disabled and abled.
- o. Allow for the development of a new competitive sport in the track and cross-country distance arena, wherein a wider ability grouping of individuals could compete together at faster speeds.
- p. Allows for the convenient disassembly into partible components, packing and backpacking or other easy transport of the pedestrian cycle.

CONCLUSION AND SCOPE

Thus it has been shown that at least one embodiment of the pedestrian cycle 1 provides enhanced ambulatory capacity in any human gait to users of all ages, capacities, disabilities and infirmities having widely differing abilities and capabilities. Also shown is the capacity of the pedestrian cycle 1 to allow ambulatory capacity with substantively little impact on the skeletal joints or jarring of internal and external organs of the user. It has been further shown that the saddle assembly 66 of the pedestrian cycle will avert harmful pressure on the sensitive and vulnerable perinea of the rider and thereby provides the comfort needed to remain aboard for long periods of time over long distances, whether aggressively exercising or casually ambling about.

Although the description above contains many specificities, these should not be construed as limitations on the scope of the invention, but as merely providing illustrations of some of the presently preferred embodiments. Many variations are possible, it should be noted. Accordingly, the scope of the invention should be determined by the appended claims and their legal equivalents, rather than by these examples or embodiments herein described.

I claim:

1. A pedestrian cycle, comprising:
    a cycle frame comprising a generally elongated front frame member, a generally elongated rear frame member and a generally inverted U-shaped connecting frame member connecting the front frame member and the rear frame member, wherein the rear frame member is disposed at an acute angle with respect to the front frame member of the cycle frame;
    a front wheel provided on the front frame member and a rear wheel provided on the rear frame member; and
    a saddle assembly suspended from the inverted U-shaped connecting frame member between the front wheel and the rear wheel.

2. The pedestrian cycle of claim 1 wherein the saddle assembly is suspended between the front frame member and the rear frame member of the cycle frame.

3. The pedestrian cycle of claim 2 wherein the saddle assembly is adjustable along the front frame member and the rear frame member of the cycle frame.

4. The pedestrian cycle of claim 1 wherein the saddle assembly comprises at least one flexible front seat support strap and at least one flexible rear seat support strap carried by the cycle frame and a seat carried by the at least one front seat support strap and the at least one rear seat support strap.

5. The pedestrian cycle of claim 4 wherein the at least one front seat support strap comprises a pair of front saddle support straps and the at least one rear seat support strap comprises a pair of rear seat support straps.

6. The pedestrian cycle of claim 1 further comprising a steering assembly carried by the cycle frame and engaging the front wheel.

7. A pedestrian cycle, comprising:
    a cycle frame comprising:
        a generally elongated front frame member;
        a generally elongated rear frame member disposed at an acute angle with respect to the front frame member of the cycle frame;
        a generally inverted U-shaped connecting frame member connecting the front frame member and the rear frame member; and
        a frame interior defined by the front frame member, the rear frame member and the generally inverted U-shaped connecting frame member;
    a front wheel carried by the front frame member of the cycle frame;
    a rear wheel carried by the rear frame member of the cycle frame; and a saddle assembly suspended from the generally inverted U-shaped connecting frame member.

8. The pedestrian cycle of claim 7 wherein the saddle assembly is suspended between the front frame member and the rear frame member of the cycle frame.

9. The pedestrian cycle of claim 8 wherein the saddle assembly is adjustable along the front frame member and the rear frame member of the cycle frame.

10. The pedestrian cycle of claim 7 wherein the saddle assembly comprises at least one flexible front seat support strap and at least one flexible rear seat support strap carried by the front frame member and the rear frame member, respectively, of the cycle frame and a saddle carried by the at least one front seat support strap and the at least one rear seat support strap.

11. The pedestrian cycle of claim 10 wherein the at least one front saddle support strap comprises a pair of front seat support straps and the at least one rear seat support strap comprises a pair of rear seat support straps.

12. The pedestrian cycle of claim 7 further comprising a steering assembly carried by the cycle frame and engaging the front wheel.

13. The pedestrian cycle of claim 7 further comprising a brake system provided on the cycle frame.

14. A pedestrian cycle, comprising:
   a cycle frame comprising:
      a generally elongated front frame member;
      a generally elongated rear frame member disposed at an acute angle with respect to the front frame member;
      a generally inverted U-shaped connecting frame member connecting the front frame member and the rear frame member; and
      a frame interior defined by the front frame member, the rear frame member and the connecting frame member;
   a front wheel carried by the front frame member of the cycle frame;
   a rear wheel carried by the rear frame member of the cycle frame;
   a saddle and brace assembly suspended from the generally inverted U-shaped connecting member; and
   a steering assembly comprising:
      a handlebar shaft receptacle carried by the front frame member of the cycle frame;
      a handlebar shaft extending through and rotatable with respect to the handlebar shaft receptacle and engaging the front wheel; and
      handlebars carried by the handlebar shaft.

15. The pedestrian cycle of claim 14 wherein the saddle and brace assembly is suspended between the front frame member and the rear frame member of the cycle frame.

16. The pedestrian cycle of claim 15 wherein the saddle and brace assembly comprises at least one flexible front saddle support strap and at least one flexible rear saddle support strap carried by the front frame member and the rear frame member, respectively, of the cycle frame; a seat and brace frame carried by the at least one flexible front saddle support strap and the at least one flexible rear seat support strap; and a brace and a saddle carried by the seat and brace frame.

17. The pedestrian cycle of claim 16 wherein the saddle and brace frame of the saddle and brace assembly comprises a seat support portion carried by the at least one flexible rear saddle support strap and a brace support portion extending from the saddle support portion and carried by the at least one flexible front saddle support strap, and wherein the saddle is carried by the saddle support portion and the brace is carried by the brace support portion of the saddle and brace frame.

\* \* \* \* \*